United States Patent [19]

Vranish

[11] Patent Number: 5,540,630
[45] Date of Patent: Jul. 30, 1996

[54] TWIST PLANET DRIVE

[75] Inventor: John M. Vranish, Crofton, Md.

[73] Assignee: The United States of America as represented by the Administrator of the National Aeronautics and Space Administration, Washington, D.C.

[21] Appl. No.: 370,584

[22] Filed: Jan. 3, 1995

[51] Int. Cl.⁶ .............................. F16H 1/28; F16H 13/06
[52] U.S. Cl. ..................... 475/338; 475/339; 475/340; 475/346
[58] Field of Search ...................... 475/338, 339, 475/340, 341, 342, 346

[56] References Cited

U.S. PATENT DOCUMENTS

| | | | |
|---|---|---|---|
| 2,868,037 | 1/1959 | Hindmarch | 475/338 X |
| 3,160,026 | 12/1964 | Rosen | 475/346 X |
| 3,675,510 | 7/1972 | Duggar, Jr. | 475/346 X |
| 3,721,135 | 3/1973 | Kelley | 475/340 X |
| 5,366,423 | 11/1994 | Mori et al. | 475/341 X |

FOREIGN PATENT DOCUMENTS

| | | | |
|---|---|---|---|
| 559626 | 9/1993 | European Pat. Off. | 475/340 |
| 398613 | 6/1909 | France | 475/342 |
| 2693529 | 1/1994 | France | 475/339 |
| 405321987 | 12/1993 | Japan | 475/342 |
| 1579380 | 11/1980 | United Kingdom | 475/338 |

*Primary Examiner*—Khoi Q. Ta
*Attorney, Agent, or Firm*—Keith L. Dixon

[57] ABSTRACT

A planetary gear system includes a sun gear coupled to an annular ring gear through a plurality of twist-planet gears, a speeder gear, and a ground structure having an internal ring gear. Each planet gear includes a solid gear having a first half portion in the form of a spur gear which includes vertical gear teeth and a second half portion in the form of a spur gear which includes helical gear teeth that are offset from the vertical gear teeth and which contact helical gear teeth on the speeder gear and helical gear teeth on the outer ring gear. One half of the twist planet gears are preloaded downward, while the other half are preloaded upwards, each one alternating with the other so that each one twists in a motion opposite to its neighbor when rotated until each planet gear seats against the sun gear, the outer ring gear, the speeder gear, and the inner ring gear. The resulting configuration is an improved stiff anti-backlash gear system.

16 Claims, 4 Drawing Sheets

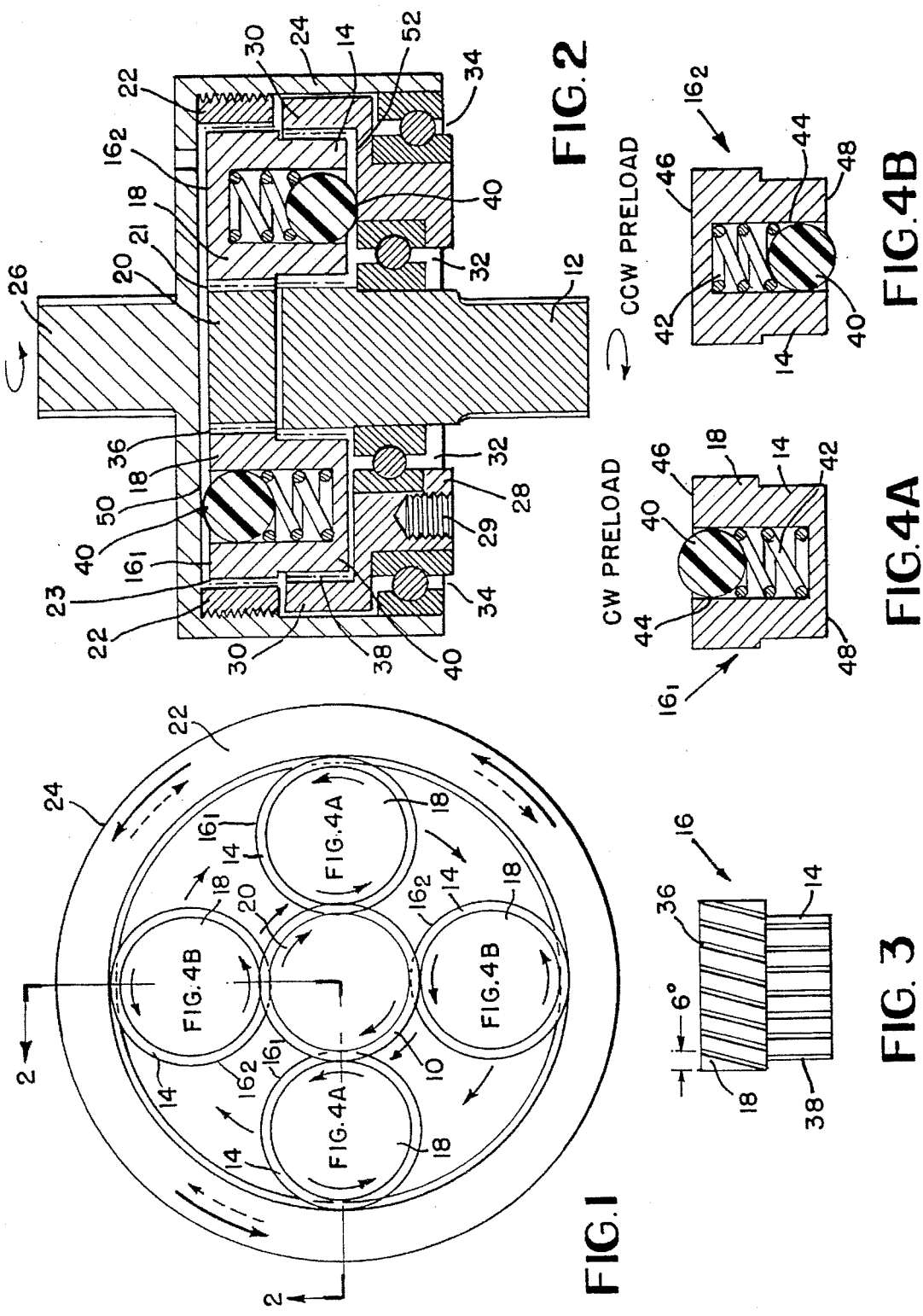

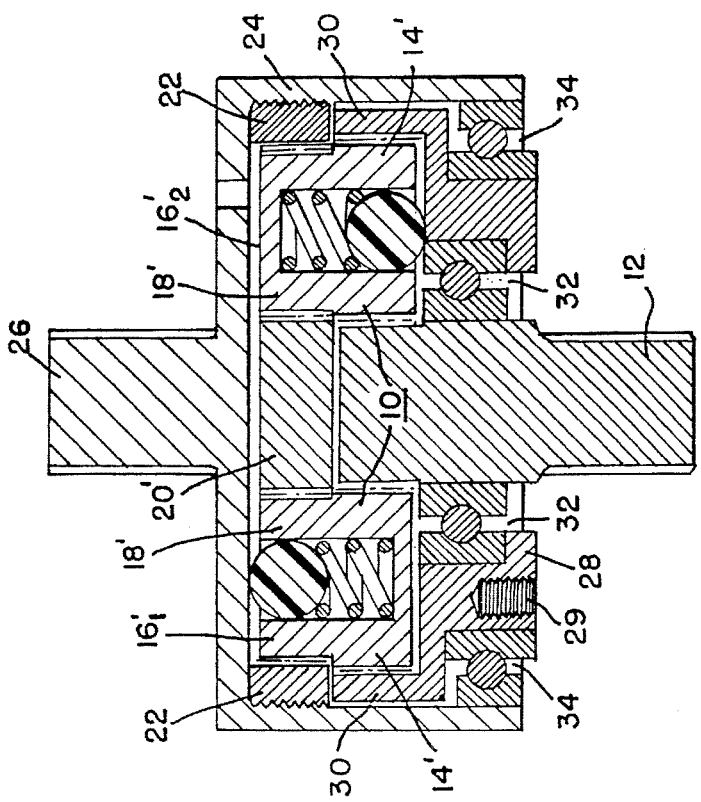
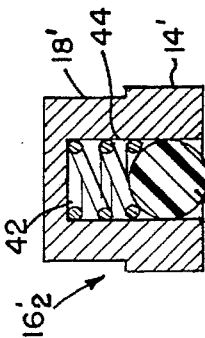
FIG.8B CCW PRELOAD
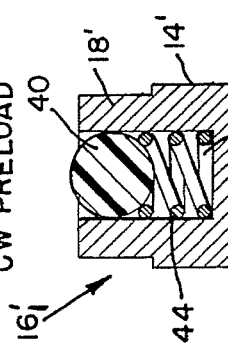
FIG.6
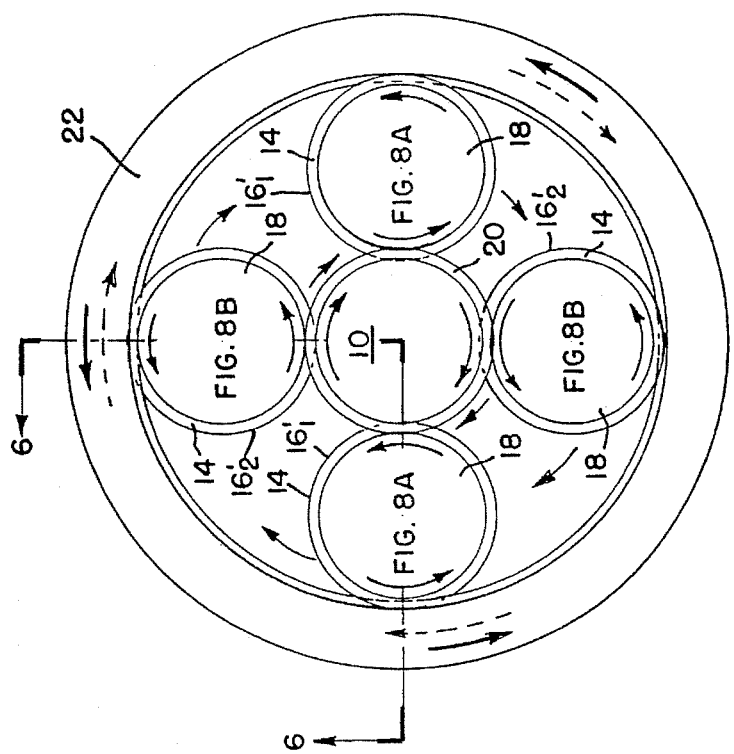
FIG.5
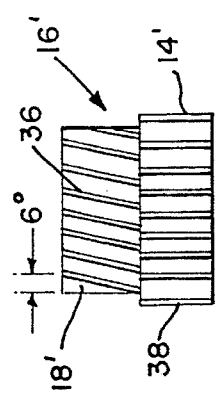
FIG.8A CW PRELOAD
FIG.7

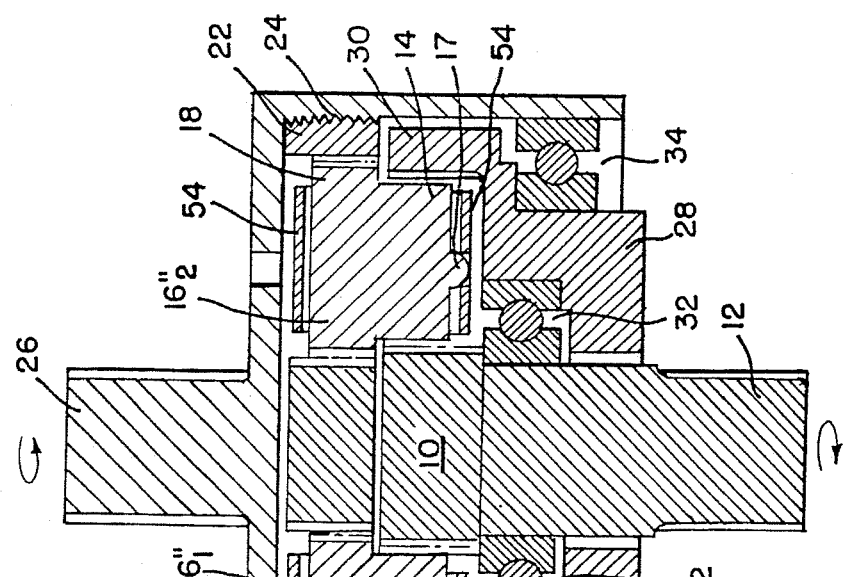
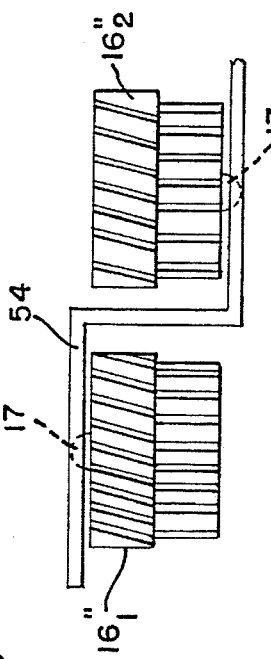
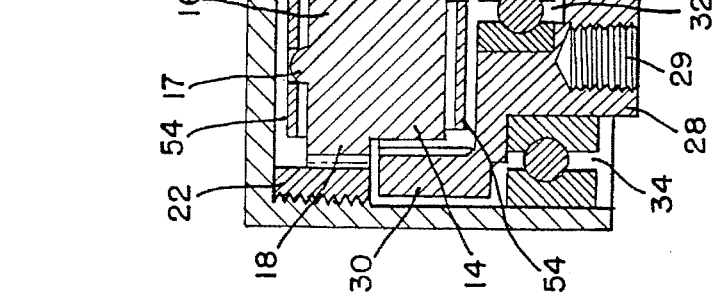
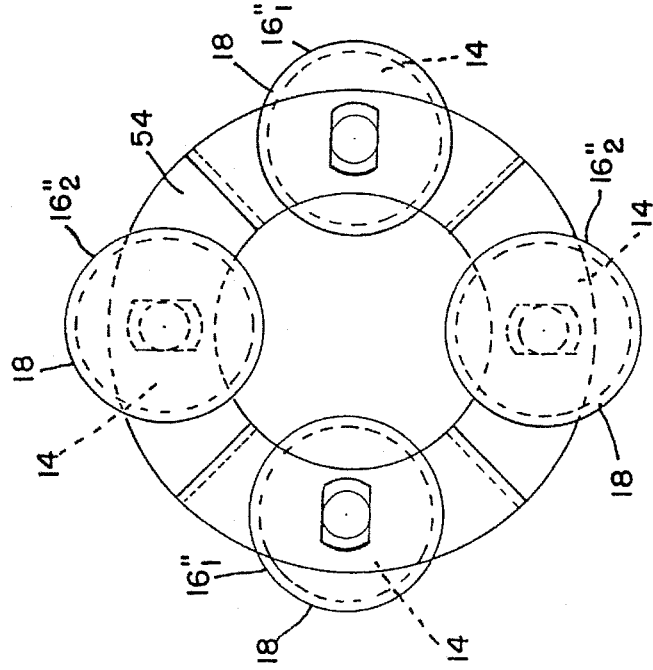

5,540,630

TWIST PLANET DRIVE

ORIGIN OF THE INVENTION

This invention was made by an employee of the United States Government and accordingly may be manufactured and used by or for the Government for governmental purposes without the payment of any royalties thereon or therefor.

BACKGROUND OF THE INVENTION

1. Field of the Invention

This invention relates generally to epicyclic gear assemblies and more particularly to a planetary gear train providing a differential planetary drive which is free of backlash.

2. Description of the Prior Art

Mechanical systems whereby rotary motion is coupled from an input member to an output member are well known and include such devices as harmonic drives and planetary gear systems.

Harmonic drives provide a means for providing high torque amplification in a compact package. Typically, such drives are generally comprised of two types, namely a cup-type drive and a pancake-type drive and consist of a wave generator, a flex spline and a circular spline. When the wave generator is rotated in the clockwise direction, for example, it presses against the flex spline in two diametrically opposite points and distorts the flex spline in the process. These distortions force the gears on the outside of the flex spline to push on their opposite number gears on the inside of the circular spline. This in turn causes the two splines to rotate with respect to one another. The drive mechanism is essentially frictional. With the motion from the inside out, the engagement angles are very steep and efficiency is relatively good, particularly for a cup-type configuration. Also, the torque multiplication is relatively high; however, the flex spline is prone to overstressing and failure via ratcheting. Since the system is frictional in nature, lubrication and efficiency become a problem, particularly in the pancake-type drive.

Planetary gear systems do not provide high torque amplification and are not anti-backlash devices; however, they are compact, strong and have no non-linearities between their input and output motions. Planetary gear systems typically include a sun gear, at least three planetary gears, and an outer ring gear, with a carrier being provided for maintaining a mutual separation between the planetary gears. The torque output can be provided by any of the members, including the carrier, depending upon its design.

Because backlash is known to present a problem, anti-backlash gears are used in certain applications and are typically configured as two identical gears joined together by a torsion spring. These gears counter rotate relative to one another until each seats on the opposite face of their respective gear teeth into which they are fitted. For very light loads, this acts very well. For larger loads, however, the spring is easily overpowered and a situation arises where one of the gears takes the full force of the load first so that it is not truly an anti-backlash system.

Also known in the art is a carrier-less planetary gear transmission. Such a system includes true anti-backlash gears wherein each gear is comprised of two gears which are coupled together by a rifled spline interface. These gears are pushed away from one another by means of a spring, and in the process of moving away from each other, spin with respect to each other on the rifled spline interface until they contact the opposite sides of the gears they come into contact with in the anti-backlash mode. The rifled spline interface, being a locking angle, the anti-backlash gears do not slide back down the rifled spline when they come under load. Hence the system remains a true anti-backlash system.

Further, the prior art also includes a differential planetary transmission system which does not require a carrier. Such a system splits the sun drive gear into two sections, with the lower section being used to counteract planet gear tilt.

Although such systems operate as intended, they all nevertheless have inherent limitations.

SUMMARY

It is an object of the present invention, therefore, to provide an improvement in planetary gear systems.

It is another object of the invention to provide an improvement in differential planetary drive systems.

It is a further object of the invention to provide an improvement in planetary drive systems which exhibits improved anti-backlash properties.

It is still another object of the invention to provide a planetary drive system which is superior in performance to conventional planetary gear drives as well as harmonic drives while providing an improvement in stiffness, strength, and compactness.

Briefly, the foregoing and other objects are achieved by a planetary gear system comprised of a sun gear coupled to an annular ring gear through a plurality of twist-planet gears, a speeder gear, and a ground structure including an internal ring gear. Each planet gear comprises a solid gear including a first half portion which is a spur gear having vertical gear teeth and a second half portion which is a spur gear with gear teeth that are helical and offset from the vertical gear teeth and which contact helical gear teeth on the speeder gear and helical gear teeth on the outer ring gear. One half of the twist planet gears are preloaded downward, while the other half are preloaded upwards, each one alternating with the other so that each one twists in a motion opposite to its neighbor when rotated until each planet gear seats against the sun gear, the outer ring gear, the speeder gear, and the inner ring gear. The resulting configuration is a stiff anti-backlash gear arrangement which provides an improvement not only in mechanical advantage, but also in compactness, efficiency and strength.

BRIEF DESCRIPTION OF THE DRAWINGS

The following detailed description of the invention will be more readily understood when considered together with the accompanying drawings wherein:

FIG. 1 is a top plan view schematically illustrative of a first embodiment of the invention;

FIG. 2 is a central longitudinal cross sectional view of the embodiment shown in FIG. 1 taken along the lines 2—2 thereof;

FIG. 3 is a front planar view illustrative of the planet gears shown in FIG. 2;

FIGS. 4A and 4B are central longitudinal axial views further illustrative of the planet gears shown in FIG. 2;

FIG. 5 is a top plan view schematically illustrative of a second embodiment of the invention;

FIG. 6 is a central longitudinal cross sectional view of the embodiment shown in FIG. 5 taken along the lines 6—6 thereof;

FIG. 7 is a front planar view illustrative of the planet gears in the second embodiment of the invention shown in FIG. 6;

FIGS. 8A and 8B are central longitudinal cross sectional views further illustrative of the planet gears shown in FIG. 6;

FIG. 9 is a top plan view schematically illustrative of a first variation of the first embodiment of the invention shown in FIG. 2;

FIG. 10 is a central longitudinal cross sectional view illustrative of the embodiment of the invention and partially shown in FIG. 9;

FIG. 11 is a partial planar view further illustrative of the carrier spring arrangement in the embodiment shown in FIG. 10;

DETAILED DESCRIPTION OF THE INVENTION

Figure 13:
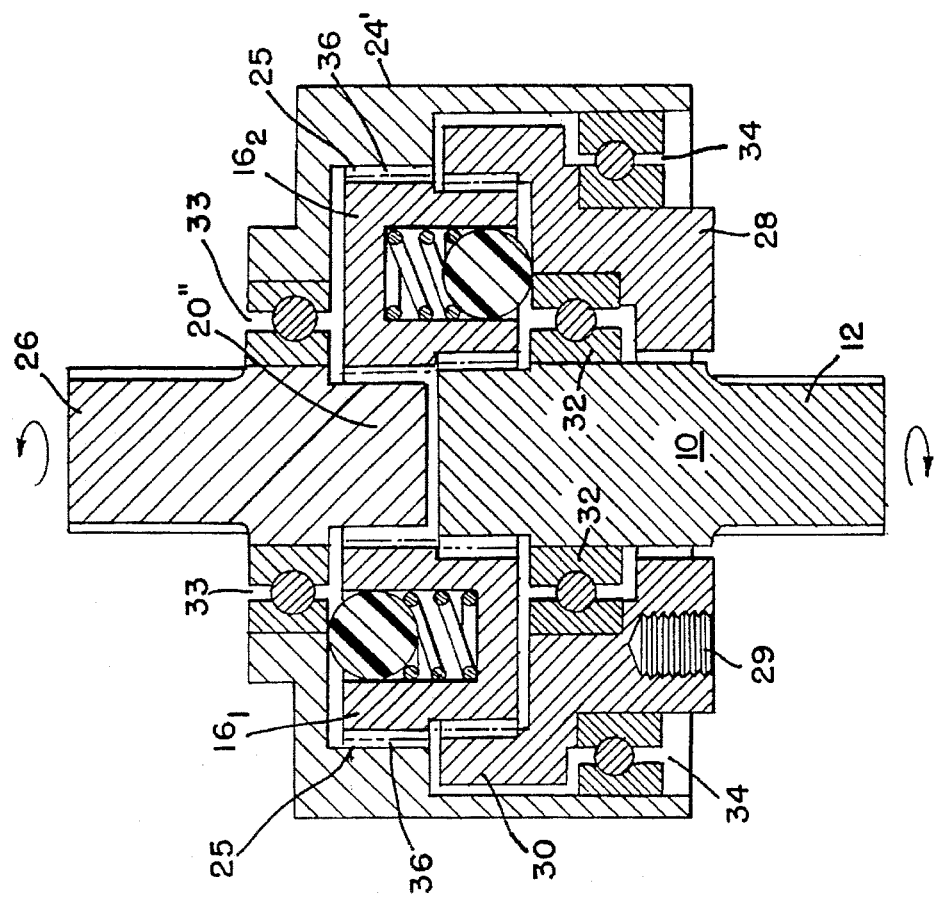
FIG. 13 is a central longitudinal axial cross sectional view of the embodiment shown in FIG. 12 taken along the lines 13—13 thereof.

Prior to considering the preferred embodiments of the invention, it should again be noted that with respect to the known prior art, harmonic drives provide a means of high torque amplification in a compact package. Such devices have shortcomings, however, in that they ratchet under large loads since they engage two gear teeth at a time and as a consequence, they strip. Hence, they are inefficient and have non-linear harmonic distortions in the relationship between their respective input and output motions which complicates control factors. While harmonic drives are nearly anti-backlash in their function, they do nevertheless, have a relatively small amount of backlash.

With respect to conventional planetary gear systems, they do not provide high torque amplification, and they normally do not provide an anti-backlash feature. Nevertheless, they are compact, strong and have no non-linearities between their input and output motions.

The present invention is directed to an improvement in planetary gear systems in order to provide the best performance characteristics for both harmonic drives and planetary gear drives while eliminating their worst properties. In addition, the embodiments which are to be now explained are intended to be more efficient, stiffer, stronger, less expensive to manufacture and exhibiting better controllability and anti-backlash properties than conventional harmonic drives and planetary gear systems.

Referring now to the drawings wherein like reference numerals refer to like parts throughout, attention is directed to a first embodiment of the invention which is depicted in FIGS. 1, 2, 3, 4A and 4B and which is directed to a "reverse" planetary drive in that the direction of the output rotation is opposite to the input. In the Figures, reference numeral 10 denotes a sun gear which includes a splined input shaft member 12. The sun gear 10 threadably engages the first or lower portion 14 of four planet gears 16 (FIG. 3). The planet gears 16 include a relatively larger diameter upper gear portion 18 which threadably engages a speeder gear 20 on one side and an outer annular ring gear 22 segment on the other side. The ring gear segment 22 is threadably attached to a ring gear housing assembly 24 which includes a splined output shaft 26. Additionally, as shown in FIG. 2, a ground element 28 including an inner annular ring gear portion 30 threadably engages the outer side of the smaller diameter lower portion 14 of each planet gear 16. A pair of ball bearing assemblies are included in the structure of FIG. 2 and comprise an inner ball bearing assembly 32 which permit the sun gear 10 to rotate relative to the ground element 28 which in turn is adapted to be secured to a device, not shown, via a single threaded bore 29. The outer ball bearing assembly 34 permits the outer ring gear 22 and housing 24 to be driven so that it also rotates around the ground element 28.

It is significant to note that each planet gear 16 includes two separate sets of threads or gear teeth as shown in FIG. 3. The gear teeth 36 which are formed on the outer surface of the upper portion 18 are helical in configuration and having a pitch which is on the order of 6° while the gear teeth 38 located on the bottom portion 14 of the planet gear 16 are vertical teeth. Moreover, the gear teeth 36 and 38 are slightly offset with respect to one another, thus providing two different sets of spur gears on a common gear body. The helical gear teeth 36 are adapted to mate with the helical gear teeth 21 and 23 respectively formed on the speeder gear 20 and the outer ring gear segment 22, while the straight vertical gear teeth 38 are adapted to mate with vertical gear teeth 13 on the inner end of the sun gear 10 and the inner ring gear segment 30 as shown in FIG. 2.

While the four planet gears 16 are located mutually equidistantly around the sun gear 10 and the speeder gear 20, the upper segment 18 has a larger diameter than the lower segment 14. This diameter difference is significant as will become apparent hereinafter.

It is also significant to note the planet gears 16 are comprised of two pairs of gears $16_1$ and $16_2$ which are preloaded in mutually opposite directions. For example, the first and third planet gear $16_1$ include a preload arrangement as shown in FIG. 4A, while the second and fourth planet gear $16_2$ include a preload arrangement as shown in FIG. 4B. However, all the preload mechanisms are alike and comprise a plastic ball member 40 and a compression spring 42 located in a central axial bore 44. For the planet gear $16_1$ shown in FIG. 4A, it includes a bore 44 formed through the top surface 46 of the upper gear portion 18, while in the planet gear $16_2$ shown in FIG. 4B, the bore 44 is formed through the bottom surface 48 of the lower gear portion 14.

As shown in FIG. 2, the ball member 40 of the first and third planet gear $16_1$ contacts the inner wall surface 50 of the outer ring gear housing 24, while the ball 40 of the second and third planet gear $16_2$ is in contact with the upper surface 52 of the ground element 28. Thus the first and third planet gears $16_1$ are preloaded in a downward direction, while the second and fourth planet gears $16_2$ are preloaded in an upward direction.

The components of the drive gear assembly shown in FIGS. 1 and 2 function together as follows. The two pairs of planet gears $16_1$ and $16_2$ are individually suspended to provide a no-backlash coupling between the sun gear 10 and the outer ring gear segment 22. As the sun gear 10 is turned clockwise(CW), for example, each of the planet gears $16_1$ and $16_2$ rotate counterclockwise. In doing so, the lower portion 14 of each of the planet gears $16_1$ and $16_2$ reacts with a force against the inner ring gear portion 30 of the ground element 28 and "pushes off" against the ground gear element 28 through the upper portion 18 to drive the output gear, i.e. the outer ring gear segment 22, to drive the outer ring gear housing 24 and the shaft 26 in a counterclockwise(CCW) direction. However, all of the planet gears $16_1$ and $16_2$ also orbit in a clockwise direction about the sun gear 10 as schematically depicted in FIG. 1. This action slows the counterclockwise rotation of the output/ring gear 22, and as a consequence, the ring gear housing 24, substantially even while the input/sun gear 10 is rotating relatively rapidly. The net output motion of the shaft 26 is the difference between the two motions as shown by the solid and dashed line arrows in FIG. 1 and can be made very small with respect to the rotation of input the shaft 12 while at the same time being in a reverse direction.

Thus what is shown in FIGS. 1 and 2 is a reverse differential planetary drive. Such a system is extremely efficient, involving essentially rolling friction and comprises a highly efficient system providing small output motions for large input motions while generating relatively large output torques in response to relatively small input torques.

The equations of motion which are set forth hereinbelow, provide a more thorough understanding of the operation of the embodiment shown in FIGS. 1 and 2. By noting that Work Out=Efficiency×Work In, then $$\alpha F_{in} R_s d\theta = F_{out}(R_{pl} - R_{pu}) d\phi \quad (1)$$

Where $\alpha$ is device efficiency; $F_{in}$ is the force on the teeth of the sun gear 10; $R_s$ is the radius of the sun gear 10; $F_{out}$ is the force on the teeth 23 of the output gear 22; $d\theta$ is the incremental angle of rotation of the sun gear 10; $d\phi$ is the incremental angle of rotation of each planet gear 16; $R_{pl}$ is the radius of lower half portion 14 of the planet gears $16_1$ and $16_2$; and $R_{pu}$ is the radius of the upper half portion 18 of the planet gears $16_1$ and $16_2$.

The relationship between the input and output torques $T_{in}$ and $T_{out}$ on the shafts 12 and 26 can be expressed as:

$$\alpha T_{in} d\theta = F_{out}(R_{pl} - R_{pu}) d\phi, \quad (2)$$

$$F_{out}(R_s + R_{pl} + R_{pu}) = T_{out}, \text{ and} \quad (3)$$

$$T_{out}/T_{in} = \alpha(R_s + R_{pl} + R_{pu}) d\theta/(R_{pl} - R_{pu}) d\phi \quad (4)$$

where $R_{pl} d\theta$ is the movement of the planet gear center; $(R_{pl} - R_{pu}) d\phi$ is the output travel; and $R_s d\theta$ is equal to $2R_{pl} d\phi$.

The ratio of $T_{out}/T_{in}$ can then be stated as:

$$T_{out}/T_{in} = \alpha 2 R_{pl}(R_s + R_{pl} + R_{pu})/R_s(R_{pl} - R_{pu}) \quad (5)$$

Examining equation (5), it can be seen that with the upper half portion 18 of a planet gear 16 being larger in radius than the lower half portion 14, the torque mechanical advantage will be negative and hence an output motion is generated in the reverse direction to the input. Equation (1) illustrates that the differential motion nature of the device and the denominator of equation (5) is illustrative of how this relates to torque mechanical advantage. Clearly then, a small differential motion will result with relatively high torque mechanical advantages.

Up to this point there has been described a device in which the output differential motion is opposite to the direction of the input motion. Moreover, this motion is generated by the manner in which the straight gear teeth 38 on the bottom portion 14 of each planet gear interfaces with the sun gear 10 on one side and with the annulus gear 30 on the other side, while the helical spur gear teeth 36 on the upper half portion 18 interface with the speeder gear 20 on one side, and with the annulus gear 22 on the other side, both of which include helical gear teeth.

With the planet gears 16 being of identical construction and when half of the planet gears $16_1$ are preloaded downward while the other half $16_2$ are preloaded upwards, each one alternating with the other, each planet gear 16 twists in a motion opposite to its neighbor until each seats against the sun gear 10, the ground ring gear 30, the ring gear 22 secured to the output housing 24 and the helical speeder gear 20. The resultant, moreover, is a device which includes true antibacklash arrangement of gears which are alternately CW and CCW preloaded, depending upon their respective preload orientation as shown in FIGS. 4A and 4B.

Due to the fact that a common helical pitch angle, e.g. 6° from the vertical, is provided, it constitutes a locking angle. The planet gears 16 will not slip down under load and the device is, in effect, a true and stiff anti-backlash device and functions the same as those included in a carrierless planetary drive except that the planetary gears 16 of the subject invention comprise one piece elements. Accordingly, they can be made much more compact and much stiffer. Furthermore, it should be noted that an even number $n \geq 4$ of planet gears 16 are required, with every other preload biased opposite to its neighbor. This means that only one half of the planet gears 16 are load bearing at any one time. It is also interesting to note that the speeder gear 20 is used to prevent the upper portions 18 of each planet gear from being pushed inwards by reactions from the large loads encountered in the transmission of torque.

On the other hand, the planet gears 16 must not move too far vertically in order to receive enough rotation to take out the backlash. This apparent contradiction is solved by introducing a deliberate misalignment between the gear teeth 36 and 38 in the upper and lower half portions 18 and 14 of the planet gears and requiring the twist adjustment compensation for manufacturing tolerances only.

The equations set forth below illustrate this approach. For example, $$B_e = B_{lp} + B_{up}/2 + \Delta BP_{1,u} \quad (6)$$

where: $B_\theta$ is the effective backlash between sun gear 10 and output ring gear 22 (total backlash); $B_{lp}$ is the backlash between sun gear 10, the lower half portion 14 of the planet gears 16 and ground ring gear element 30; $B_{up}$ is the backlash between speeder gear 20, the upper half portion 18 of the planet gears 16 and the ground ring gear element 30; and $\Delta BP_{1,u}$ is backlash between lower and upper half portions 14 and 18 of planet gears 16. And, $$B_0 = B_e - \Delta B_p \quad (7)$$

where: $B_0$ is the backlash offset, i.e. the offset between the lower and upper gear teeth 36 and 38; and $\Delta B_p$ is the backlash adjustment which can be expressed as, $$\Delta B_p = \Delta h(\tan \phi) \quad (8)$$

where: $\Delta h$ is the vertical distance the planet gear 16 must separate to provide backlash adjustment; and $\phi$ is preload tab contact angle.

The function of the speeder gear 20 in the embodiment shown in FIGS. 1 and 2, is critical and will now be discussed. If one assumes a clockwise (CW) drive of the sun gear shaft 12 and accordingly the sun gear 10, this motion causes the sun gear 10 to encounter the CW preload planet gears $16_1$ of FIG. 4A and force each of the planet gears $16_1$ to rotate counterclockwise (CCW) even as they are orbiting clockwise around the sun gear as shown in FIG. 1. Further, it can be shown that each of the CW preload planet gears $16_1$ pivots about a point on one of the spur gears of the ground ring gear portion 30 and drives the output ring gear segment 22 counterclockwise. However, it can be shown that the forces and torques generated there cause the CW preload planet gears $16_1$ to twist about an axis which in turn will cause the system to bind under load. However, any tilting that occurs results in added force on the speeder gear 20 which duly transfers this force to the neighboring CCW preload planet gears $16_2$ of FIG. 4B. This transferred force acts on the CCW planet gears $16_2$ in such a way as to help drive the sun gear 10 which serves to straighten the tilting of the CW preload planet gears $16_1$. On balance, one can see that under load both the CW and the CCW preload planet gears $16_1$ and $16_2$ in effect tilt; however, this tilt is held to a minimum by the force and torque feedback activities of the speeder gear 20. What little tilt that does occur helps to shift the forces up and down the moment arms of the planet gears $16_1$ and $16_2$ around a pivot axis, not shown. Thus the tipping torques are minimized even as the forces are balanced. The speeder gear 20 as shown in FIG. 2 fits in the unused space adjacent the sun gear 10 and can be left free floating. A speeder gear 20 thus adjusts and holds its position based on the influence of the other forces acting against it.

The configuration thus described is termed a "twist planet drive" insofar as the manner in which the forces act upon the planet gears 16. In the first embodiment, the output is counter-rotational to the input, that is, when the input shaft 12 is rotated clockwise, the output shaft 26 is caused to rotate counterclockwise, and vice versa. It is also possible to provide an embodiment of the twist planet drive in which the output is in the same direction as the input.

A "forward" drive comprises a second embodiment of the invention as shown in FIGS. 5, 6, 7, 8A and 8B. Such a configuration is essentially the same as that shown with respect to the reverse drive embodiment (FIG. 2), but now includes a configuration where planet gears 16' as shown in FIG. 7, have an upper portion 18' which is of a relatively smaller diameter than the lower portion 14' and thus comprises a reversal of the structure shown in FIG. 3. This, however, requires a speeder gear 20' having a relatively larger diameter than the speeder gear 20 shown in FIG. 2, and a sun gear 10' which is relatively smaller in diameter than the sun gear 10 shown in FIG. 2. The configuration shown in FIGS. 5 and 6 operates in the same manner as heretofore; however, the differential or net movement of the output annular gear 22 is very slowly in the same direction as that of the input sun gear 10' as indicated by the solid and dashed line arrows in FIG. 5. If one refers to equations (4) and (5) above, it can be seen that a large torque multiplication will be obtained; however, because the denominator of these equations is now positive, the torque output is positive, that is, in the same direction as the input, i.e. the sun gear 10'.

It is also of interest to examine the function of speeder gear 20' for the forward drive configuration. For a clockwise input, i.e. where the shaft 12 and sun gear 10' are rotated clockwise, the CW preload planet gears $16_1$' (FIG. 8A) axially move away from the ring gear member 22 and do not drive it, whereas for the reverse drive configuration (FIG. 2), the opposite is true. However, the CW planet gear $16_1$' (FIG. 8A) drives the speeder gear 20', which in turn drives the CCW preload planet gears $16_2$' (FIG. 8B). In this instance, it is the CCW planet gear $16_2$' that pivots off of the ground ring gear 30 in such a way as to drive the ring gear 22 and its associated output gear housing 24 with improved mechanical advantage. Throughout, the speeder gear 20' serves to inhibit tilt and tipping of the planet gears $16_1$' and $16_2$' and to make certain that the system runs smoothly under large loads. It should be noted that in the forward embodiment (FIGS. 5 and 6), the CW and CCW planet gears $16_1$' and $16_2$' are inclined to tip away from each other in opposite directions, whereas in the reverse embodiment shown in FIGS. 1 and 2, the planet gears $16_1$ and $16_2$ tend to tip in the same direction, which is that of the input drive. In both embodiments, however, the speeder gears 20 and 20' provide the force balancing and planet gear alignment functions.

Whereas the two embodiments considered thus far depict the top half portion 18 of the planet gears 16 and 16' including helical gear threads 36 and with the bottom half portions 14 thereof including straight gear threads, it should be noted that when desired such an arrangement can be reversed with the helical gears on the bottom and the straight gears on the top, it being a matter of choice.

Also, the planet gear preload schemes shown in FIGS. 4A, 4B, and 8A, 8B, disclose the use of embedded springs 42 and balls 40. This approach is preferred because it permits the planet gears 16 and 16' to fit along an axial length into the shortest possible packaging space.

However, an alternative approach is shown in FIGS. 9–11 where a single carrier spring 54 which is circular in configuration (FIG. 9) alternately couples to the top and bottom of planet gears $16_1$" and $16_2$" via elements 17 to provide the preload function. In all other respects it is the same as shown in the first embodiment of the invention as depicted in FIG. 2. In the embodiment utilizing the single carrier spring 54, it rotates with the orbiting planet gears $16_1$" and $16_2$". The wear on the carrier spring element 54 is negligible and virtually no energy is lost. Also, since the planet gears $16_1$" and $16_2$" are still independently preloaded, any number of planetary gears can be utilized as long as the number is equal to or greater than 4. Thus, one could utilize six or eight planetary gears depending upon the particular design. Such a configuration will act to increase the strength of the device.

Figure 12:
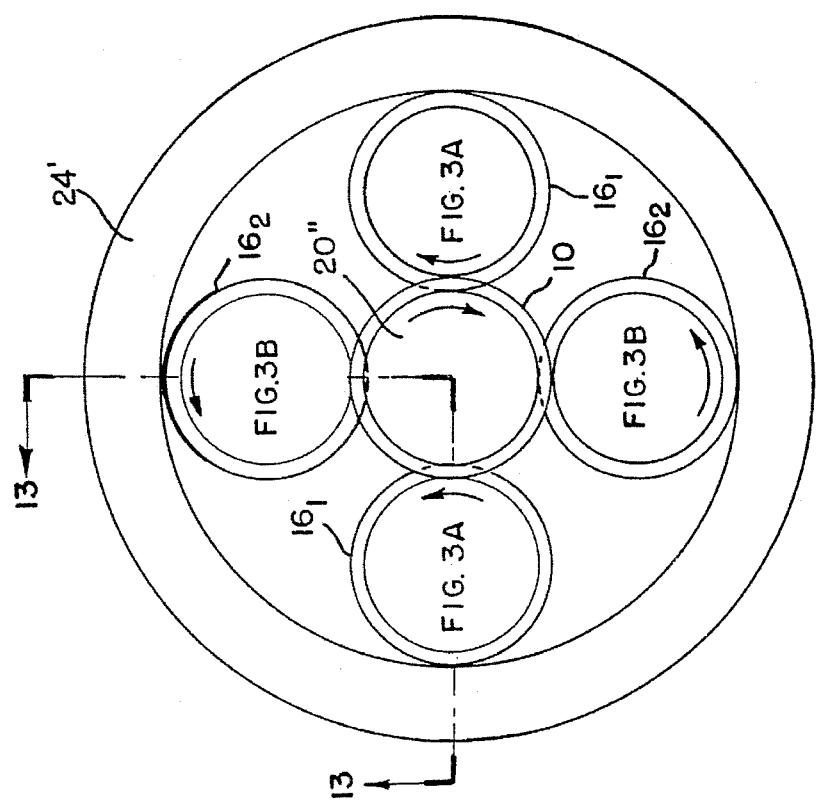
FIG. 12 is a top planar view schematically illustrative of a second variation of the embodiment shown in FIG. 2.

Referring now to FIGS. 12 and 13, shown thereat is a modification of the first and second embodiment shown in FIGS. 1, 2 and 5, 6 but where the output shaft 26 is integral with the speeder gear 20 and where the input shaft 12 is coupled thereto through the sun gear 10 and the planet gears $16_1$ and $16_2$. This is provided by the inclusion of a third ball bearing assembly 33 between the output shaft 26 and the ring gear housing structure 24' so that the latter is freed from the output shaft 26. Also, the ring gear element 22 is eliminated in favor of a gear toothed inner rim surface 25 which is adapted to engage the teeth 36 in the upper portion 18 of the two planet gears $16_1$ and $16_2$. Such a device, for example, is adapted to provide a very high speed multiplication of the rotary motion of the input shaft 12 to the output shaft 26 while providing a compact and efficient package with no backlash and no carrier element.

Having thus shown and described what is at present considered to be the preferred embodiments of the invention, it should be noted that the same has been made by way of illustration and not limitation. Accordingly, all modifications, alterations and changes coming within the spirit and scope of the invention are herein meant to be included.

I claim:

1. An epicyclic gear assembly, comprising:

a sun gear member;

an even numbered plurality of planet gear members wherein each of said planet gear members includes a first and second integral body portion of circular cross section with said first integral body portion including straight gear teeth and said second integral body portion including helical gear teeth which are offset from said straight gear teeth with said first and said second integral body portions further including mutually different diameters;

a first ring gear member surrounding said sun gear member and coupled with said first integral body portion, with said first integral body portion being located between said sun gear member and said first ring gear member and said first ring gear member further having gear teeth of the same type as that of said first integral body portion;

a speeder gear member located axially adjacent said sun gear member wherein said speeder gear member threadably engages said second integral body portion; and a second ring gear member surrounding said speeder gear member and said second integral body portion of said planet gear members wherein said second integral body portion is coupled with said speeder gear member and said second ring gear member, said speeder gear member and said second ring gear member further having gear teeth of the same type as that of said second integral body portion.

2. A gear assembly according to claim 1 wherein said second integral body portion has a diameter greater than said first integral body portion so as to provide a direction of rotation the reverse of that of said sun gear member when said sun gear member comprises a drive input gear.

3. A gear assembly according to claim 1 wherein said first integral body portion has a diameter less than said second integral body portion so as to provide a direction of rotation the same as that of said sun gear member when said sun gear members comprise a drive input gear.

4. A gear assembly according to claim 1 wherein said spiral type gear teeth have a pitch of approximately 6°.

5. A gear assembly according to claim 1 wherein said sun gear comprises a drive input element, said first ring gear member comprises one part of a ground element and said second ring gear member comprises one part of a drive output element.

6. A gear assembly according to claim 5 wherein said sun gear includes a drive input shaft and wherein said drive output element includes a drive output shaft.

7. A gear assembly according to claim 6 wherein said output element includes a gear housing enclosing said sun gear, said planet gears, said speeder gear, and said ground element including said first ring gear member.

8. A gear assembly according to claim 7 and additionally including a first roller bearing assembly rotatably supporting said sun gear and said ground element and a second roller bearing assembly rotatably coupling said ground element and said gear housing.

9. A gear assembly according to claim 7 wherein said planet gear members are preloaded planet gears which are spring biased alternately in mutually opposite directions against said gear housing and said ground element.

10. A gear assembly according to claim 9 wherein said preloaded planet gears are spring biased by a compression spring and a round surface member abutting said spring and wherein said spring and said round surface member are located in a bore formed in one end of each of said planet gears.

11. A gear assembly according to claim 10 wherein said round surface member comprises a ball member.

12. A gear assembly according to claim 9 wherein said preloaded planet gears are spring biased by a carrier spring alternately coupled to respective top and bottom portions of said planet gears.

13. A gear assembly according to claim 12 wherein said carrier spring is circular in configuration.

14. A gear assembly according to claim 1 wherein said sun gear member comprises a drive input element including an input shaft and said speeder gear member comprises a drive output member including an output shaft.

15. A gear assembly according to claim 14 wherein said first ring gear member comprises one part of a ground element.

16. A gear assembly according to claim 15 and additionally including a first roller bearing assembly rotatably supporting said sun gear and said ground element, a second roller bearing assembly rotatably coupling said ground element and said gear housing, and a third roller bearing assembly rotatably coupling said gear housing and said speeder gear.

* * * * *